Jan. 17, 1928.

A. MOORE 1,656,358

DOUBLE PASSAGE ANTIDETONATION CYLINDER HEAD FOR INTERNAL COMBUSTION ENGINES

Filed Jan. 3, 1927

2 Sheets-Sheet 1

INVENTOR
Arlington Moore
BY
H. H. Dyke
ATTORNEY

Jan. 17, 1928.
A. MOORE
1,656,358
DOUBLE PASSAGE ANTIDETONATION CYLINDER HEAD FOR INTERNAL COMBUSTION ENGINES
Filed Jan. 3, 1927     2 Sheets-Sheet 2
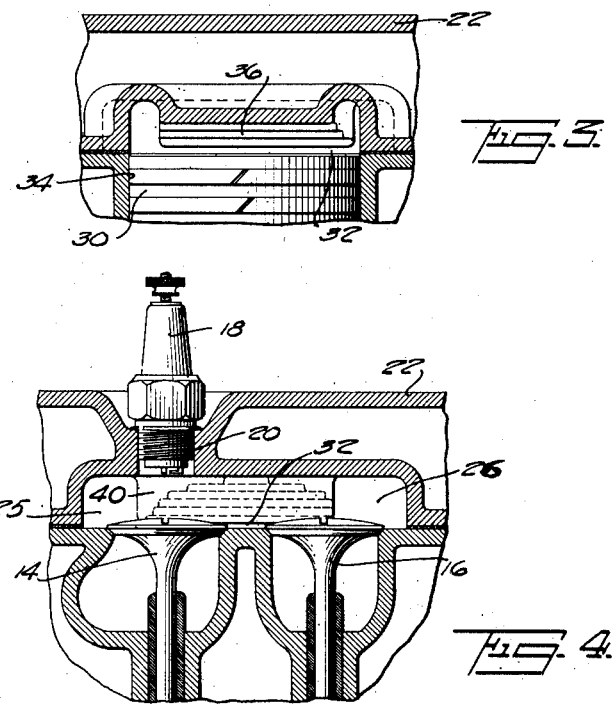
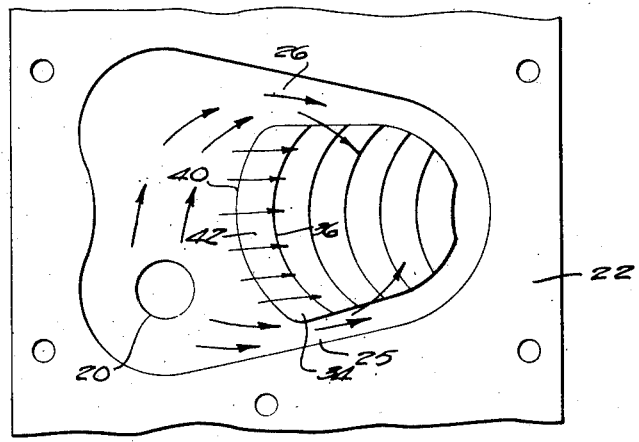
INVENTOR
Arlington Moore
BY
ATTORNEY Patented Jan. 17, 1928.

1,656,358

UNITED STATES PATENT OFFICE.

ARLINGTON MOORE, OF NEW YORK, N. Y., ASSIGNOR, BY MESNE ASSIGNMENTS, TO MAXMOOR CORPORATION, OF NEW YORK, N. Y., A CORPORATION OF DELAWARE.

DOUBLE-PASSAGE ANTIDETONATION CYLINDER HEAD FOR INTERNAL-COMBUSTION ENGINES.

Application filed January 3, 1927. Serial No. 158,485.

My invention is of a cylinder head for internal combustion engines.

The object of the invention is the provision of a cylinder head, which is so constructed as to prevent detonation and pre-ignition. The present invention is distinguished from the invention of my application Serial No. 158,484, for anti-detonation cylinder head for internal combustion engines, filed on even date herewith, principally by the provision of a double passage or passage at each side of the combustion chamber in the cylinder head, instead of the single passage at one side thereof disclosed in said copending application.

The invention is illustrated herein as applied to an L-head engine to which it is well adapted, but may be made use of with other engines. L-head engines can be equipped at manufacture with cylinder heads of my invention, or new heads can be installed as a replacement proposition on old engines.

Figure 1:
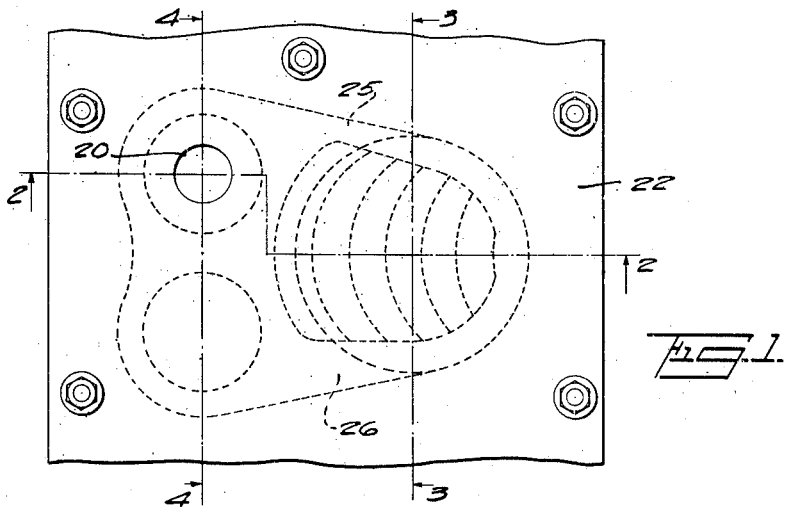
Figure 2:
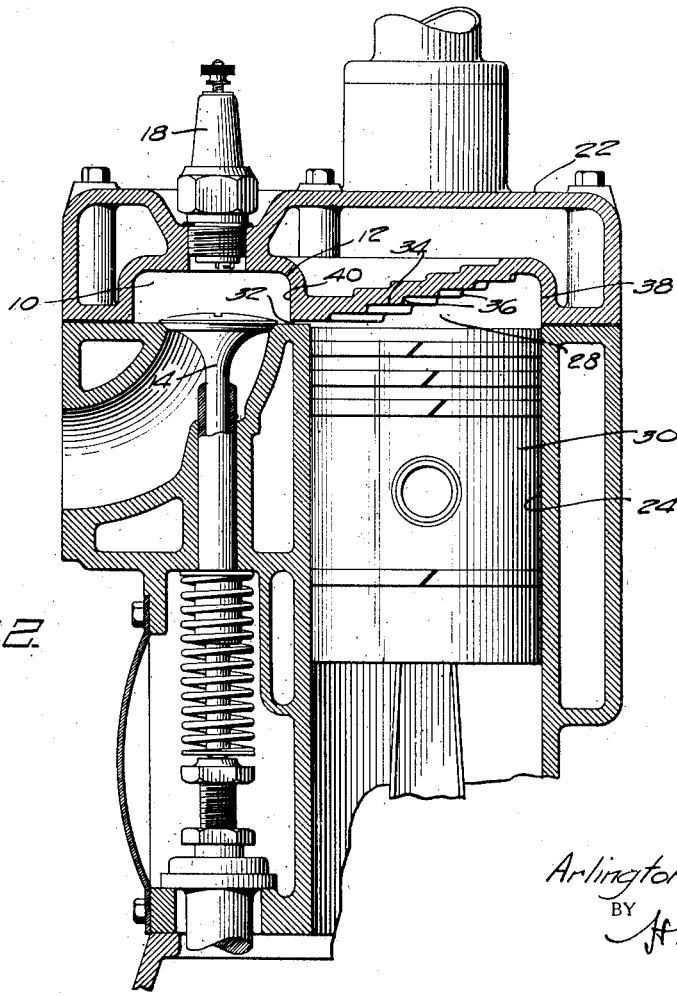

In the accompanying drawings, Fig. 1 is a fragmentary plan view of a cylinder head with the top wall or ceiling of the combustion chamber therein indicated by dotted lines. Figs. 2, 3 and 4 are sectional views on the lines 2—2, 3—3, and 4—4, respectively, of Fig. 1, and Fig. 5 is a fragmentary plan view of a cylinder head shown as being taken off the engine and inverted.

With my invention as applied to an L-head engine, the end 10 of the combustion chamber 12 which is over the inlet valve 14 and exhaust valve 16, is left wide open in the usual manner so as to permit free valve movement and provide plenty of room for ingress and egress movements of the charge gases and the gaseous products of combustion.

The spark plug 18 is preferably located in the hole 20 formed in the cylinder head 22 over the intake valve 14.

Adjacent to the space 10 over the valves and toward the cylinder bore 24, I form the cylinder wall head so that freely open passages 25 and 26, of the full height of the combustion chamber, are provided at each side of the combustion chamber for communication from the over-valve part 10 of the combustion chamber 12 to that part 28 of the combustion chamber over the cylinder bore 24 and head of piston 30, while intermediate of the passages 25 and 26, located on the sides of the combustion chamber 12 adjacent to the intake valve 14 and the exhaust valve 16 respectively, the communication between the chamber parts 10 and 28 is confined to the passage 32, which is quite narrow or small in vertical dimension, and serves to permit a reduced and retarded movement of gases therethrough relatively to their free movement through the higher and more open passages 25 and 26.

Beyond the narrow or low passage 32, the ceiling of the part 28 of the combustion chamber 12 is raised by gradual steps, as by the provision of flat or tread surfaces 34 and riser surfaces 36, which are preferably of substantially concentric arcuate formation when viewed in plan. See Figs. 1 and 5. These stepped surfaces preferably extend substantially all the way across the part 28 of the combustion chamber to the end 38 thereof opposite the end containing the valve chamber 10.

The face 40 of the projection 42 extending downwardly in the combustion chamber is preferably made substantially straight up and down, so that movement of gases in the combustion chamber part 10 is principally through the long way of such chamber part 10.

The operation (necessarily in large part assumed because not directly observable) comprises efficient agitation and mixing of the charge, particularly on the intake stroke, and also, though perhaps with less violence, on the compression stroke.

On the inlet stroke the principal part of the incoming charge passes from combustion chamber part 10 to part 28 thereof through the high passages 25 and 26, and is practically evenly distributed therebetween, as while passage 25 is not so wide as passage 26, the gases going through the latter passage must first traverse the chamber part 10 through the long way thereof and in so doing pass over and take up heat from exhaust valve 16, thus heating the gases and cooling the exhaust valve. A smaller part of the intake gases passes through the constricted opening 32 between the projection 42 and the cylinder block and in so doing are retarded to some extent, and this splitting up and partial retarding of the incoming gases results in a thorough mixing of the charge gases within the cylinder. On compression the movement is substantially the reverse of that taking place during intake. The agitation prevents preignition by taking heat from any parts which may tend to get too hot and transferring it to the jacket walls.

Upon ignition by the spark plug 18 located at the end of space 10 next to passage 25, there is a free propagation of flame through passage 25 into the part 28 of the combustion chamber, and a similarly free but somewhat longer passage through the long way of combustion chamber part 10 and the wider passage 26 into the combustion chamber part 28. Between passages 25 and 26 there is a relatively retarded flame propagation through the constricted passage 32, all as indicated by heavy and light arrows respectively in Fig. 5. Thus the flame wave from behind the relatively abrupt or straight up and down wall part 40 on the valve side of the projection 42 extending downward in the combustion chamber ceiling, reaches the gases in the combustion chamber part 28 from three directions and at slightly different intervals of time, and furthermore the step and riser construction of the ceiling of the chamber part 28 affords opportunity for repeated expansion steps taking place therein, so that with the capacity for repeated expansion of the gases, and with the agitation which is taking place, and the propagation of flame in different directions and at different intervals of time, there is complete absence of possibility of any stagnant pockets of charge material getting to a condition of temperature and pressure to cause their flashing into self-ignition and thereby producing the effect of so-called detonation.

The subject matter of my invention disclosed in this application and not claimed therein is disclosed and claimed in part in my copending application Serial No. 158,484, filed January 3, 1927, and in part in one or more of the following copending applications filed by me: Serial No. 125,414, filed July 28, 1926; Serial No. 140,726, filed October 11, 1926; Serial No. 142,230, filed October 18, 1926; Serial No. 142,231, filed October 18, 1926; Serial No. 143,317, filed October 22, 1926; Serial No. 145,212, filed October 30, 1926.

I claim:

1. A cylinder head for four-cycle internal combustion engines, having a combustion chamber of material height over the valves and over the cylinder bore, and having passages of material height between said combustion chamber parts, with an intermediate passage which is relatively narrowed down in height.

2. A cylinder head for four-cycle internal combustion engines, having a combustion chamber of material height over the valves and over the cylinder bore, and having passages of material height along the sides of the combustion chamber and extending between said combustion chamber parts, with an intermediate passage which is relatively narrowed down in height and thereby constricted.

3. A cylinder head for four-cycle L-head internal combustion engines, having relatively high combustion chamber parts over the valves and over the cylinder bore respectively, a relatively low passage between said combustion chamber parts, and relatively high passages therebetween adjacent to the intake valve and the exhaust valve respectively.

4. A cylinder head for four-cycle L-head internal combustion engines, having the combustion chamber part over the cylinder bore formed with a ceiling of abruptly changing heights, and a relatively high combustion chamber part over the valves with relatively high side passages, and a relatively low intermediate passage from the combustion chamber part over the valves to the part thereof over the cylinder bore.

5. A cylinder head for four-cycle L-head internal combustion engines, having a combustion chamber therein which has two relatively high parts connected by a passage which comprises two separated relatively high parts and an intermediate relatively low part.

6. A cylinder head for four-cycle L-head internal combustion engines, having a combustion chamber therein, the ceiling wall whereof has a downward projection between the valves and the cylinder bore extending substantially into proximity with the cylinder block from near the inlet valve side of the combustion chamber to near the exhaust valve side thereof, said extension having an abruptly descending face on the side thereof presented toward the valves, whereby the valves work in a combustion chamber part which is in communication with the combustion chamber part over the cylinder bore through passages left on each side of said projection and through a narrow passage left under said projection, the side of said projection away from the valves being formed into substantially arcuate alternate step and riser surfaces producing a gradual increase in height of the combustion chamber in the direction away from the valves.

7. A cylinder head for four-cycle L-head internal combustion engines, having the combustion chamber part near the cylinder bore formed with a ceiling of abruptly changing heights increasing as the distances from the valves are increased, and a relatively high combustion chamber part over the valves, with relatively high side passages and a relatively low intermediate passage from the combustion chamber part over the valves to that over the cylinder bore, the high passage adjacent to the exhaust valve being wider than that adjacent to the inlet valve, and a spark plug in said cylinder head located substantially over the intake valve.

In testimony whereof, I have signed my name hereto.

ARLINGTON MOORE.